United States Patent [19]

Ichii

[11] 4,021,827
[45] May 3, 1977

[54] FILM FORWARDING MEANS

[75] Inventor: Hirokazu Ichii, Omiya, Japan

[73] Assignee: Fuji Photo Film Co., Ltd., Minami-ashigara, Japan

[22] Filed: Aug. 29, 1975

[21] Appl. No.: 608,950

[30] Foreign Application Priority Data

Aug. 30, 1974 Japan .............................. 49-100073
Aug. 30, 1974 Japan .............................. 49-100074

[52] U.S. Cl. ............................... 354/212; 354/83
[51] Int. Cl.² ........................................ G03B 1/00
[58] Field of Search ............ 354/83, 86, 212, 213

[56] References Cited

UNITED STATES PATENTS

| | | |
|---|---|---|
| 3,392,649 | 7/1968 | Ruhle .................................. 354/213 |
| 3,563,145 | 2/1971 | Bendoni et al. ...................... 354/86 |
| 3,678,830 | 7/1972 | Erlichman ............................. 354/86 |
| 3,709,122 | 1/1973 | Blinow et al. .................... 354/83 X |
| 3,872,485 | 3/1975 | Asano ................................. 354/83 |
| 3,936,850 | 2/1976 | Goto .................................. 354/212 |

Primary Examiner—John Gonzales
Attorney, Agent, or Firm—Sughrue, Rothwell, Mion, Zinn & Macpeak

[57] ABSTRACT

Film forwarding means provided as a block unit in a rear portion of a camera, able to engage film from the rear thereof, and automatically moved to a position for film engagement when the camera is closed and moved out of this position when the camera is open, whereby film change is unhindered.

2 Claims, 4 Drawing Figures

FILM FORWARDING MEANS

BACKGROUND OF THE INVENTION

The present invention relates to a means for forwarding film from one position to another in a camera. More particularly the invention relates to a film forwarding means which functions automatically and is able to engage film to be forwarded from the rear thereof.

FIELD OF THE INVENTION

There are known a great many types of film forwarding means which serve in the case of a roll film, to move film forward a distance equal to the length of one frame thereof after each successive shot taken, or, in the case of film which is employed in a so-called autoprocess camera, and is provided in the form of independent units initially contained in a pack which is loaded in the camera, each film unit being for the production of one photograph, and being able to be developed by a diffusion-transfer process and moved out of the camera immediately after exposure thereof, to move successive film units from the pack and into engagement with means for developing film units and effecting movement thereof to the exterior of the camera. Film forwarding means may be of the manually actuated type or of the automatically actuated type, the latter type being generally preferred, particularly for use in autoprocess cameras since it is difficult to ensure correct movement and satisfactory processing of film units by manually controlled means.

The majority of such means are provided in a camera in a position which is forward with respect to film loaded in the camera, and contact film from the forward side thereof, i.e., the side thereof facing the camera lens system. Such location of film forwarding means presents various disadvantages is that since the forward, photosensitive side of film is contacted special care must be paid to the disposition, material, and shape of the forwarding means. Another disadvantage is that such film forwarding means being located forward of the film side which is initially exposed to form a latent image, mounting of the forwarding means is subject to particular restrictions, since the forwarding means must not obstruct image-wise light directed onto the film. In other words, film forwarding means must be accommodated in a restricted space, in addition to which, since the forwarding means is mounted in an interior portion of the camera, initial mounting and repair thereof are rendered that much more difficult. The problem of restricted space may be to some extent obviated by providing different portions of a film forwarding means in different, otherwise unoccupied, spaces within a camera, the different portions being connected by suitable linkages requiring little space. Such means, however, must still be provided in portions of a camera which are of relatively difficult access, and also require comparitively skilled staff for the assembly thereof, and assembly time is long. In other words, these means are comparatively expensive to assemble and in terms of mass production are evidently less advantageous than a film forwarding means which can be provided as a complete pre-assemblable unit.

To overcome disadvantages of conventional means there has been provided film forwarding means of the type, disclosed in Japanese Pat. No. 49-030332, assigned to the present assignee, which comprises portions mounted on a pivotal rear cover of a camera and portions mounted in a rear portion of the camera, behind film loaded in the camera, these different portions coming into connection when the rear cover is closed in such a manner that a forwarding pawl element is brought into engagement with an engagement portion of film in the camera, for example a perforation hole in the film is roll film, or if film units are employed, with a film unit edge portion, in either case the pawl element approaching film from the rear and being driveable to forward engaged film by motor means provided in the camera. This forwarding means provides the advantages that only relatively unsensitive backing or edge portions of film are contacted, and that the means is provided in a portion of the camera which is easily accessible and wherein mounting space requirements may be easily met, another advantage being that the means permits use of film units having photosensitive sheet portions which are initially provided independently in a forward portion of a pack and so may be easily held in a good flat relationship with respect to the camera optical system. There is, however, room for improvement in the disclosed means, since slight displacement of the camera rear cover from its original setting may result in imperfect connection of the different portions of the means, and hence failure of the means to function properly, in addition to which the means to function properly, in addition to which the means has a disadvantage from the point of view of assembly since it is provided as dispersed portions.

Film forwarding means frequently employ a pawl element for actual engagement of film, since, compared with friction rollers, for example, such an element offers the advantage that engagement of film is very sure, and forwarding distance may be controlled very exactly. However, since such a pawl element must normally be in a position to engage film, it may consitute a hindrance when film in a camera is changed, unless it can be moved away from its normal position when the camera is opened, it being desirable, of course, that such movement of the pawl element be effected without application of any force liable to damage the element.

It is accordingly a principal object of the present invention to provide film forwarding means which is mountable in a rear portion of a camera, approaches film from the rear thereof, and is automatically actuated to forward film upon completion of camera shutter release action.

It is a further object of the invention to provide film forwarding means which may be constituted in the form of a block unit.

It is another object of the invention to provide film forwarding means which is entirely mountable in a fixed interior portion of a camera and does not risk misalignment of elements thereof due to opening or closing of a camera.

It is yet another object of the invention to provide film forwarding means comprising a film engagement means which is automatically moved to a first position wherein it may engage film when the camera is closed, and to a second position wherein it may not engage film, and hence does not hinder film loading or unloading, when the camera is open, movement of the engagement element between the first and second positions being effected without application of force liable to impose strain thereon.

It is yet another object of the invention to provide film forwarding means comprising only simply manufactured and assemblable parts and requiring only conventional drive means.

SUMMARY OF THE INVENTION

In accomplishing these and other objects there is provided, according to the present invention, film forwarding means which is constituted as a single block unit mounted in the rear portion of the main body of a camera having an openable and closeable rear cover, and comprises a film engagement means in the form of a pawl element carried by a carrier means which is rotatably and slidably mounted on a fixed shaft means disposed parallel to the line of film advance, may be reciprocally moved along the shaft means by a motor-driven slide plate means, and is guided during reciprocal motion thereof by guide means rotatably mounted on the guide shaft means, the carrier means being automatically caused to complete this reciprocal motion once upon termination of each actuation of the camera shutter means, and film engaged by the engagement means being advanced a requisite distance during the forward stroke of this motion. The carrier means is constrained to follow rotational movement of the guide means about the shaft means but is free to slide with respect thereto. In other words, movement of the carrier means is controlled by the slide plate means, but the setting thereof with respect to the longitudinal axis of the shaft means, and hence the position of the film engagement means relative to the camera location for film to be forwarded is determined by the setting of the guide means. By the combined action of spring means and stop means, the guide means may be moved to a first position, or may be moved by a position change means acting counter to the force of this spring means to a second position, the film engagement means being brought to a position for engagement of film when the guide means is at the first position, and to a position clear of film location when the guide means is at the second position. When the camera rear cover is opened to permit loading or unloading of film, the position change means is free to move the guide means to the second position whereby film may be changed without hindrance from the film engagement means. When the rear cover is closed a projecting portion of the position change means is contacted and pressed by the rear cover, or a projection thereon, which moves the position change means out of engagement with the guide means, whereby the guide means may be brought to the first position and the film engagement means to a position to engage film. Thus the means of the invention provides the combined advantages that film may be approached from the rear thereof, and that pawl means ensuring accurate forwarding of film may be employed, but without risk of hindrance to film change. Also, since it is constituted as a block unit and is mounted in the rear portion of the camera, the means of the invention lends itself to mass-manufacture and mounting thereof in a camera requires little time and may be effected by comparatively unskilled staff.

A better understanding of the invention may be had from the following full description of one preferred embodiment thereof when read in reference to the attached drawings, in which like numbers refer to like parts.

DESCRIPTION OF THE PREFERRED EMBODIMENT

Before proceeding with the description it is to be noted that although the invention is described and shown below by way of example only with reference to use for forwarding diffusion-transfer type film units, there is no intention of limitation to such use and the means of the invention is equally employable for forwarding other types of film.

Figure 1:
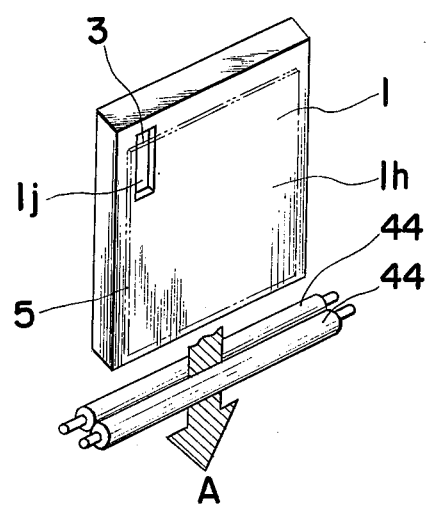
FIG. 1 is a perspective view of the film pack shown in relationship to film processing rolls provided in an auto-process camera.
Figure 2:
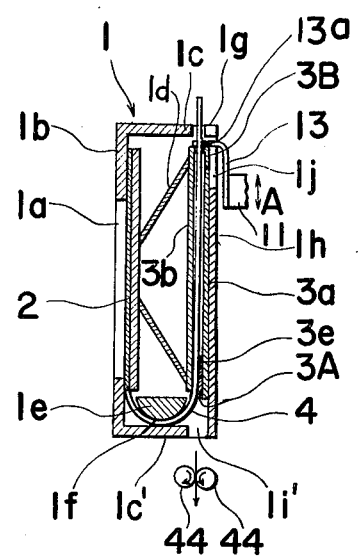
FIG. 2 is a cross-sectional view of the film pack of FIG. 1.

Reference is first had to FIGS. 1 and 2 which show a film pack 1 which contains film in the form of individual film units and is loadable in, for example a so-called auto-process camera, which is a camera permitting production of photographs by a diffustion-transfer process carried out within the camera, successive film units being processed and moved to the exterior of the camera immediately subsequent to exposure thereof, during which process other film units may remain in the camera, there thus being made available to a photographer a completed photograph after each exposure, without it being necessary to proceed to a special establishment for development of film. The film pack 1 is a comparatively flat, generally rectangular case made of plastic or other suitable lightproof material. In the front wall 1b of the pack 1 there is formed an exposure opening 1a through which a film unit may be exposed. The rear wall 1h of the pack 1 defines, together with the pack top wall 1c, a slot 1g permitting passage of a film leader 4, and together with the pack bottom wall 1c' a film unit removal slot 1i', and has formed in an upper corner portion thereof an engagement opening 1j through which a forwarding pawl 13 included in a film forwarding means 11 may pass to engage an exposed film unit and move the film unit out of the pack 1, in a manner described in greater detail below.

Each film unit, of which only one is shown in FIG. 2, for simplicity, comprises a photosensitive sheet 2, which is exposable to form a latent image of an object and a pair of sheets 3a and 3b, which together constitute an envelope for containment of the photosensitive sheet 2, sheet 3a being suitably a lightproof material, and sheet 3b a material on which a viewable image corresponding to the latent image of the photosensitive sheet 2 may be formed under the action of processing solution spread through the film unit. Initially, i.e., prior to exposure, the photosensitive sheet 2 is separate from the sheets 3a and 3b, the photosensitive sheet 2 is positioned in the front portion of the pack 1, against the exposure opening 1a, and the sheets 3a and 3b are positioned in the rear portion of the pack 1, in line with the leader slot 1g and film unit removal slot 1i, the lightproof sheet 3a being rearmost and in contact with the pack rear wall 1h. The sheets 2, 3a, and 3b are maintained in their respective positions and in good flat relationship with respect to the pack front wall 1b and rear wall 1h by a pressure plate 1d, which is suitably made of a plate spring material slightly larger than the photosensitive sheet 2 and is provided in the central portion of the pack 1 and exerts forward pressure on the sheet 2 and rearward pressure on the sheets 3a and 3b. The lower edges of the sheets 3a nd 3b are initially unattached and define an opening 3A via which the photosensitive sheet 2 may be moved into the envelope constituted by the sheets 3a and 3b, and in which there is provided a pod 3e which is attached to sheet 3a, for example, is breakable and contains a processing solution. The upper edges of the sheets 3a and 3b are attached to one another and constitute a top end 3B in which there is defined a slit through which a leader 4 having one end detachably bonded to the lower-edge of the photosensitive sheet 2 may pass, the leader 4 subsequently passing through the slot 1g in the top wall of the pack 1, and the opposite end thereof being attached to a wind-up means (not shown). In the normally loaded position of the film unit, the top end 3B thereof lies slightly below the top of the engagement slot 1j, whereby the forwarding pawl 13 may pass through the slot 1j to engage the top end 3B, as shown most clearly in FIG. 2. The upper and lower edges of the sheets 3a and 3b have associated therewith capsules or layers of adhesive, whereby these edges may be bonded together under the action of a pressure means. When the photosensitive sheet 2 has been exposed, the leader windup means is actuated, for example by a motor started when shutter action finishes, and the exposed sheet 2 is drawn by the leader 4 from the exposure station in the forward portion of the pack 1 and downwards into a transfer area 1f defined in the lower end portion of the pack 1, turned 180° about a semi-circular guide element 1e provided in the transfer area 1f, and then drawn upwards into the envelope constituted by the sheets 3a and 3b until the leading end thereof is brought into contact with the film unit top end 3B, which prevents further advance of the photosensitive sheet 2. The leader 4, however, may still pass through the slit formed in the top end 3B. The windup means continues to be actuated for a short time after the sheet 2 reaches the top end 3B, whereby the leader 4 is detached from the sheet 2 and drawn completely through the slit 1g, the sheets 2, 3a and 3b thus being unattached and constituting an independent film unit 5 ready for forwarding out of the pack and subsequent processing. To permit the above described action to be repeated for succesive film units contained in the pack 1, leaders 4 of successive film units may be attached by trailers to each other so as to be able to be drawn one by one through the slot 1g. Subsequently, the pawl 13 is actuated to move the independent film unit 5 downwards, out of the pack 1, via the removal slot 1i, and into engagement with a pair of rolls 44, which are actuated at this time in response to a signal from a known control means, and break open the processing solution pod 3e, and while forwarding the film unit 5 to the exterior of the camera to cause the processing solution of the pod 3e to be spread through the film unit 5, thereby causing diffusion and transfer of the image of the exposed photosensitive sheet 2 onto the transfer sheet 3b, at the same time the ends 3A and 3B of the film unit 5 being sealed due to pressure applied by the rolls 44, whereby there is obtained a viewable print of the photographed object, on the sheet 3b, and, if sheet 3b comprises a suitable lightproof layer, a negative image on the sheet 2, which may be subsequently used for reproduction of further copies of the photographed object.

Figure 3:
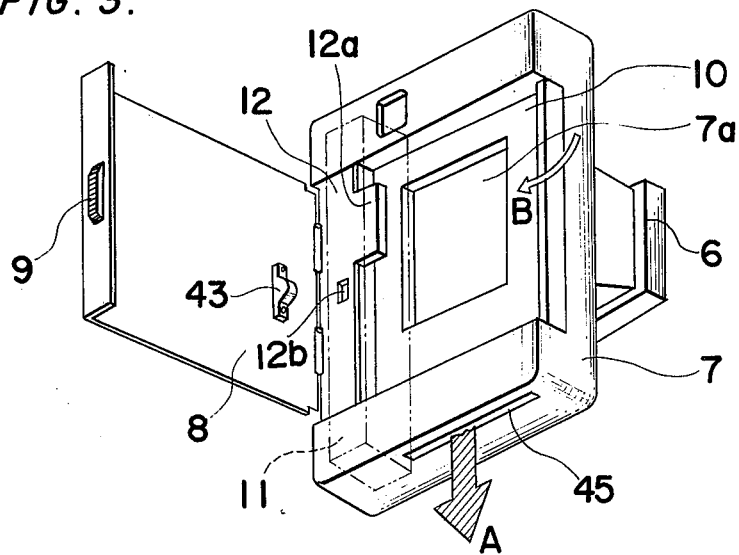
FIG. 3 is a schematic, perspective view showing an auto-process camera having the rear cover thereof in open position and indicating a film forwarding means mounting location.

The film pack 1 may be loaded into a camera such as that shown in FIG. 3, for example, which comprises a main body 7, which accommodates shutter and shutter release means (not shown) and defines a mounting chamber 10 for accommodation of the film pack 1, and to the front of which is attached a lens mount 6 carrying a lens system (not shown). When the film pack 1 is loaded in the mounting chamber 10, the exposure opening 1a thereof is aligned with an opening 7A, which is defined in the front of the pack mount portion 10 and is in line with the optical path of the lens system in the lens mount 6, whereby a foremost photosensitive sheet 2 in the pack 1 may be exposed to image-wise light upon actuation of the camera shutter means. As noted above the film unit removal slot 1i of the loaded film pack 1 is in line with a pair of processing rolls 44. These rolls 44, not shown in FIG. 3, are provided in the lower portion of the camera and are in line with a film unit exit 45 which is formed in the camera bottom wall and via which processed film units 5 may be moved to the exterior of the camera. The main body 7 is provided with a pivotal rear cover 8, which may be moved to an open position to permit loading or unloading of a film pack 1 into or from the camera, or may be held in a closed position by means of a lock screw element 9, for example. On the inner side of the cover 8 there is fixedly mounted a forwardly projecting disengagement element 43 which when the cover 8 is in a closed position contacts and presses a pivot lever 20, whose function is described in detail below, and which is provided in the film unit forwarding means 11. As indicated by the chain-dot line portion of FIG. 3, the forwarding means 11 is accommodated inside the camera alongside that side of the film pack 1 to which the engagement opening 1j is nearest, and is protected by a cover 12, the pawl 13 projecting slightly away from the main portion of the forwrding means 11 and being protected by an extension cover 12a. The cover 12 has defined therein a small hole 126 through which the disengagement element 43 may pass.

Figure 4:
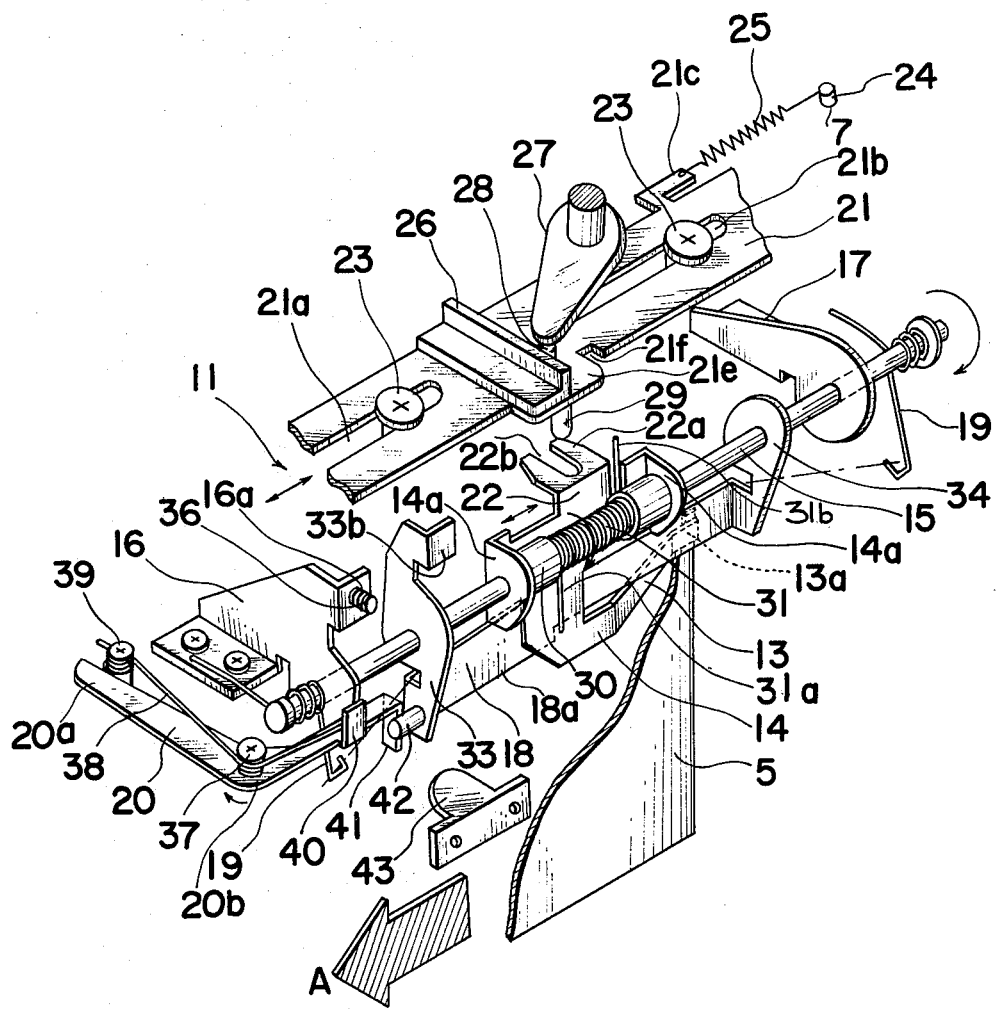
FIG. 4 is an explode, perspective view of film forwarding means, partially disassembled, according to one embodiment of the invention.

The film forwarding means 11 is shown in greater detail in FIG. 4 to which reference is now had. The pawl 13 comprises a main portion which is comparatively long, has one end integrally attached to a carrier 14, and an opposite end defining a hook end 13a, which is the pawl portion which actually enters the engagement opening 1j of the pack 1 to engage the end 3B of a film unit 5. The carrier 14 comprises a main portion constituted as a simple plate, the pawl 13 being attached to a lower end portion of and being inclined rearwardly away from this main portion as seen in the drawing, and a pair of support tabs 14a which are integrally attached to and are at right-angles to opposite sides of the carrier main portion and are rotatably and slidably mounted on a fixed shaft 15 disposed in a line parallel to the plane of the rear wall 1h of the loaded pack 1 and having opposite ends supported in support plates 16 and 17 which are fixedly mounted inside the camera main body 7, the carrier 14 and pawl 13 thus being reciprocally slidable along a line parallel to the direction of forwarding of a film unit 5 out of the pack 1, and also being rotatably moveable around the shaft 15 towards or away from the pack 1. Integrally attached to the upper edge of the carrier 14 main portion is a small plate portion 22a which is at right-angles thereto, extends rearwardly as seen in the drawing, i.e., with respect to the carrier 14 main portion, in the opposite direction to the tabs 14a, and defines a fork 22b which is engageable by a downwardly projecting pin 29 fixedly attached to a slide plate or reciprocal member 21 described below.

The distance of the carrier 14 and pawl 13 from the pack 1 is determined by the setting of a guide element 18 comprising a pair of tabs 33 and 34 which are rotatably mounted on the shaft 15, and are larger than and straddle the carrier tabs 14a, i.e., the tabs 14a lie between the tabs 33 and 34, and between the lower end portions of which there is disposed an integrally attached main portion 18a which is constituted by a long rectangular plate disposed adjacent to the lower portion of the main portion of the carrier 14. The lower edge portion of the carrier 14 extends somewhat below the lower edge of the guide main portion 18a, whereby the pawl 13, which as noted above is inclined with respect to the carrier 14, may extend from one side of the guide main portion 18a to the other side thereof, without contacting the main portion 18a. Extending between the carrier tabs 14a there is provided a sleeve 30 which is freely rotatable and slidable on the shaft 15, and has a narrower central portion, around which there is wound a wire spring 31. One end portion 31a of the wire spring presses against the carrier 14 main portion and urges the carrier 14 main portion into contact with the guide main portion 18a, and the other end portion 31b thereof is engaged in a notch 21f of the slide plate 21, whereby the carrier 14 is always moved to as near to the film pack 1 as is permitted by the guide 18.

The tabs 33 and 34 of the guide 18 are each engaged by one of a pair of wire springs 19 which are mounted on pins fixedly attached to the camera body 7 interior adjacent to opposite ends of the shaft 15, and exert a constant force to rotate the guide 18 in a direction such that the main portion 18a thereof, and hence the lower portion of the carrier 14 and pawl 13 are moved towards the film pack 1. Movement of the guide 18 more than a certain amount in this direction is prevented by a contact piece 33b integrally formed at right-angles to the upper end of the tab 33 of the guide 18 coming into contact with a correspondingly dimensioned contact piece 16a integrally formed at right-angles to an upper portion of the support plate 16. When the contact pieces 33b and 16a are in contact, the guide main portion 18a is in a position, referred to below as the engagement position, such that the hook end 13a of the pawl 13 carried on the carrier 14 pressed against the guide 18 due to the action of the spring 31, passes through the slot 1j of the pack 1 and is in a position to fully engage the upper end 3B of a film unit 5. Fine adjustment of the exact position at which the guide 18 is stopped, and hence of the position of the pawl hook end 13b relative to a film unit 5, may be effected by means of, for example, a screw 36 which is contactable at the exterior of the camera, and which when turned changes the position of the contact piece 16a, the plate being for example slightly rotatable about the shaft 15 or being made of a slightly flexible material. Alternatively the plate 16 may be rigid and fixed, and the screw 36 may pass through the piece 16a, in which case the inner end of the screw 36 is contacted by the contact piece 33b, thereby defining the engagement position, and the piece 16a merely acts as support to the screw 36.

The abovementioned slide plate 21 is reciprocally slidable along a line parallel to the longitudinal axis of the shaft 15 between a start position and an end position defined later, and comprises a main portion in the form of a generally rectangular plate in which there is defined a pair of elliptical slots 21a and 21b having their major axis disposed along the longitudinal axis of the slide plate 21 main portion. Through each slot 21a and 21b there passes a stud 23 which is fixedly mounted to a wall portion of the camera main body 7, the studs 23 serving to guide the plate 21 during reciprocal motion thereof.

The abovementioned pin 29 extends from a small extension 21e formed in integral attachment to one side of the plate 21 and passes through the fork 22b defined by the plate 22a extending from the carrier 14, the pin 29 fitting without play, but being slidable in the fork 22b, and normally, i.e., when the carrier 14 together with the guide 18 is in the engagement position, being in a generally central portion of the fork 22b and not in contact with the root thereof. Because of engagement of the pin 29 and fork 22b, the carrier 14 and pawl 13 are constrained to move together with the slide plate 21 during reciprocal motion of the plate 21, the carrier 14 being maintained at the same distance from the pack 1 during this motion by the guide main portion 18a, whose position is maintained constant during this time, the pawl 13 thus remaining in engagement with the film unit 5. The abovementioned slot 21f in which is engaged one end 31b of the wire spring 31 for maintaining the carrier 14 in contact with the guide 18 is formed in a side edge portion of the plate 21 adjacent to the extension 21e.

To a generally central portion of the upper surface of the slide plate 21 there is fixedly attached an upraised rib 26 which is disposed normal to the longitudinal axis of the plate 21. Near one end of the plate 21 there is integrally attached a small projection 21c to which is attached one end of a tension spring 25 whose other end is attached to a pin 24 fixedly attached to a wall portion of the camera body 7. The spring 25 acts constantly to draw the slide plate 21 rightwards as seen in FIG. 4 until the left-hand ends of the slots 21a and 21b are brought against the studs 23, in which situation the plate 21 is in the start position in which the pawl 13 extends into an end portion of the film pack slot 1j and just contacts the end 3B of a film unit 5 without exerting any pressure thereon. The slide plate 21 may be moved counter to the force of the spring 25 by the action of a crank lever 27 which is rotatable about an axis normal to the line of movement of the plate 21 and has fixedly attached to the outer end thereof a pin 28. The pin 28 is disposed parallel to the crank lever 27 rotatory axis and during part of the rotation of the crank lever 27 is brought into contact with the rib 26 on the plate 21 and exerts pressure thereon to move the plate 21 from the start position to the end position, the pin 28 being moved out of contact with the rib 26 as the crank lever 27 continues to rotate, whereby the spring 25 is unopposed to return the plate 21 to the start position. The crank lever 27 is driven by a motor means (not shown), which is actuated subsequent to each shutter release action effected to expose a photosensitive sheet 2, after a delay sufficient for the exposed sheet 2 to have been drawn completely constituted by the sheets 3a and 3b and for the associated leader 4 to have been detached therefrom, and causes the lever 27 to rotate one complete revolution after each time shutter release action is effected. Each time the slide plate 21 is thus moved from the start to end, to start position, the pawl 13 is moved from one end of the pack slot 1j to the other end thereof (from the upper to the lower end thereof as seen in FIG. 2), moving a complete film unit 5 partially out of the pack 1 and into engagement with the rolls 44 during this movement, then back to its initial position wherein the hook end 13a thereof engages the upper end 3B' of the next pair of sheets 3a' and 3b', in readiness for forwarding of the next film unit 5' out of the pack 1.

If the forwarding means is employed in association with roll film, the pawl 13 engages a perforation hole, advances the film one frame-length, then returns to engage the next perforation hole. For forwarding of roll film, the crank lever 27 may of course be actuated immediately upon completion of exposure of a film frame.

Referring to the left-hand portion of FIG. 4, the guide 18 may be moved slightly counter to the force of the springs 19 by a lever 20 which has two arms 20a and 20b generally at right-angles to one another, and is pivotally mounted on a fixed pin 37. The end of arm 20b of the lever 20 defines a right-angled end portion 41 which may exert pressure on the lower end of the guide tab 33, by contacting a small extension rod 42 fixedly attached to and extending from the tab 33 lower end, for example. Near to this end of the arm 20b there extends at right-angles to an edge portion of the arm 20b an integrally attached, small plate 40 to which abuts one end of a wire spring 38, which is wound around the pivot pin 37, and has the opposite end thereof abutting a pin 39 fixedly attached to a camera wall portion, and is able to exert a force greater than the combined force of the springs 19 and 31, and which, when unopposed, acts to turn the lever 20 clockwise as seen in the drawing, that is in a direction to bring the lever end portion 41 into pressing contact against the rod 42, whereby the lever 20 causes the guide 18 to move counter to the force of the springs 19, at which time the lower end of the carrier 14 and pawl 13 are moved in the same direction as the guide main portion 18a, i.e., away from the film pack 1, movement of the carrier 14 being permitted by the pin 29 attached to the slide plate 21 since the pin 29 is normally some distance from the root of the fork 22b of the carrier plate 22a. After a certain amount of clockwise movement of the lever 20 the arm 20a thereof is brought into contact with the pin 39, whereby a limit is set to the amount guide 18 may be moved counter to the force of the springs 19. When the camera rear cover 8 is open, the spring 38 is unopposed to move the lever 20 in this manner, and the pawl 13 is thereby moved to a disengagement position wherein it is clear of the camera area 10 for accommodation of a film pack 1. In other words, when the rear cover 8 is open a film pack 1 may be loaded into or unloaded from the camera without any hindrance.

When the rear cover 8 is closed the abovementioned disengagement element 43 thereon is pressed against the plate 40 projecting from the lever arm 20b, and causes the lever 20 to pivot counterclockwise and out of engagement with the rod 42, whereby the springs 19 are unopposed to move the guide 18 to a position in which the pawl 13 is moved to a position for engagment of film.

To resume, action of the above described means is as follows. Normally, when camera rear cover 8 is closed and between exposures, the slide plate rib 26 is not engaged by the crank plate pin 28 nor the guide 18 by the lever 20, and the slide plate 21 is therefore moved by the spring 25 to its rightmost position as as seen in FIG. 4 (uppermost position as seen in FIG. 3) and the pawl 13 is held so inclined to a loaded film pack 1 that the hook end 13a, thereof engages the edge portion of a film unit 5. After exposure of a photosensitive sheet 3a, the crank plate 27 is rotated one complete revolution, whereby the slide plate 21 is moved counter to the force of the spring 25, and simultaneously moves the carrier 14 in the same direction, and the pawl 13 moves the film unit 5 as far as the processing rolls 44, which thereupon develop the film unit 5 while moving it out of the camera 7. After the crank plate pin 27 moves out of contact with the slide plate rib 26, the slide plate 21, carrier 14, and pawl 13 are returned to their normal positions, the pawl 13 being slid against the rear surface of, then brought into engagement with an edge portion of the next film unit 5', in readiness for forwarding thereof. It is to be noted that sensitive front surface portions of film are at no time contacted by the forwarding means and that since the surface of film which is contacted during return movement of the pawl 13 is the rear surface thereof, and this surface, whether in a film unit or in roll film, is a generally uniform backing or support layer of comparatively strong material, the pawl 13 may contact any portion thereof and the value of pressure applied by the pawl 13 thereon is much less critical. When a requisite number of film units 5 have been forwarded in this manner and the camera rear cover 8 is opened to permit unloading of the film pack 1 and loading of a new pack 1' the disengagement element 43 on the rear cover 8 is moved away from the lever 20, which is therefore free to pivot the guide 18 and cause the pawl 13 to be brought to a position in which it does not hinder film pack change.

Needless to say, instead of providing an element 43 on the rear cover 8, the small plate 40 of the lever 20 may have affixed thereto a rearwardly extending pin which is contacted and pressed by the actual rear cover 8 when the cover 8 is closed. In either case, whether such a pin or the element 43 is employed, means for moving the lever 20 have a comparatively large area of contact and so are not affected by any displacement of the rear cover 8 which may occur after the camera 7 has been in use for a long time.

While several embodiments of the invention have been shown and/or described it is apparent that various modifications may be made thereto without departing from the novel principles defined in the following claims.

What is claimed is:

1. In a camera having an openable and closeable rear cover, means for positioning at least exposed film in a camera interior portion thereof facing said rear cover and film forwarding means, the improvement wherein said film forwarding means comprises a reciprocal member disposed in a camera main body interior portion alongside and generally parallel to the direction of forwarding of said exposed film, drive means actuable to drive said reciprocal member in a forward direction, carrier means engaged by said reciprocal member and disposed rearwardly thereto with respect to said camera interior, forwarding pawl means carried by said carrier means for approaching said exposed film from the rear and engaging an engagement portion thereof, guide shaft means fixedly mounted along a line extending parallel to the line of forwarding of said exposed film, said carrier means being slidably and rotatably mounted on said guide shaft means and being moveable by said drive means along said guide shaft means, and position change means moveable to different positions in conjunction with opening and closing of said rear cover, and being operable to move at least said pawl means carried by said carrier means to a first position wherein said exposed film is engaged thereby when said rear cover is closed, and to a second position wherein said pawl means is clear of a position for engagement of said exposed film when said rear cover is open.

2. The camera as claimed in claim 1, wherein said guide shaft means is mounted in a rear portion of said camera, and said position change means comprises guide means rotatably mounted on said guide shaft means and comprising a main guide portion which guides and supports said carrier means during movement thereof along said guide shaft means, said camera further includes force-exerting means urging said guide means to rotate in a first direction on said guide shaft means, and position-determining means mounted within said camera for contact by and stoppage of said guide means after rotation of said guide means a certain amount in said first direction, whereby said pawl means is held at said first position, and said camera further includes release means which when said rear cover is open is moved to a position to engage said guide means and move said guide means counter to the force of said force-exerting means whereby said pawl means is moved to said second position, and when said rear cover is closed, said pawl means is moved to said first position to engage said guide means.

* * * * *